Sept. 20, 1971    P. D. DAVIS ET AL    3,605,938
FLUID-FLOW CONTROL APPARATUS
Filed April 1, 1969    2 Sheets-Sheet 1

Inventors
Paul Dominic Davis
John Norman Lane
By Cushman, Darby & Cushman
Attorneys United States Patent Office 3,605,938
Patented Sept. 20, 1971

3,605,938
FLUID-FLOW CONTROL APPARATUS
Paul Dominic Davis, 4 Firtree Grove, Butts Ash Lane,
Hythe, Southampton, England, and John Norman Lane,
"Sukiyaki," 16 Linden Gardens, Hedge End, Southampton, England
Filed Apr. 1, 1969, Ser. No. 812,094
Claims priority, application Great Britain, Apr. 5, 1968,
16,407/68
Int. Cl. B60v 1/14
U.S. Cl. 180—120
5 Claims

ABSTRACT OF THE DISCLOSURE

A flow control valve, suitable for venting cushion air from an air-cushion vehicle so as to apply lateral or longitudinal thrust forces thereto, comprises a butterfly-valve member mounted for rotation within a concavity. The hollow of the concavity is connected to the cushion space of the vehicle. The butterfly-valve member has three operative positions. When it is disposed horiozntally it closes off the concavity. When rotated in one direction or another it allows cushion air to escape from the concavity and also serves to direct it in a predetermined direction.

The invention relates to fluid-flow control apparatus.

The invention has particular application to gas-cushion vehicles, that is to say, to vehicles for travelling over a surface and which, in operation, are supported above the surface, at least in part, by a cushion of pressurised gas, for example, air, formed and contained beneath the vehicle body.

In some designs of gas-cushion vehicles, for example, those in which the vehicle-supporting cushion is wholly contained by a flexible wall or skirt attached to and depending from the vehicle body, a problem arises in the provision of lateral control of the vehicle, particularly at low speeds. This is because there is little or no frictional contact between the vehicle, or rather its skirt, and the surface over which the vehicle travels.

One solution to this problem resides in discharging controlled flows of gas from either side of the vehicle body so as to apply, by reaction, a turning moment in one direction or another to the vehicle. The gas used for this purpose may be gas released from the vehicle-supporting cushion.

Hitherto, gas discharged in this manner sometimes referred to as "puff-port" control, has required the use of a separate valve member for each side of the vehicle. The present invention, however, provides an arrangement wherein only one valve member is required for gas discharge from either side of the vehicle.

According to one aspect of the invention, fluid flow control apparatus comprises a structure having a fluid inlet, a fluid outlet and a valve member mounted for rotation within the outlet so as to be movable from a central position whereby it closes the outlet to two alternative positions whereby fluid is allowed to flow from said outlet with alternative, diverging components of direction, each of which is generally normal to the axis of rotation of the valve member.

According to another aspect of the invention, fluid flow apparatus comprises a structure defining a concavity, a butterfly-valve member mounted for rotation within the concavity about an axis extending across the mouth of the concavity and formed so that adjacent parts of the valve member and the wall of the concavity are contiguous with each other when the valve member is rotated, whereby the valve member is movable to two alternative positions, one on each side of the inlet whereby fluid is allowed to flow from the concavity with alternative, diverging, components of direction, each of which is generally normal to the axis of rotation of the valve member.

An embodiment of the invention will now be described by way of example with reference to the accompanying drawings wherein.

Figure 1:
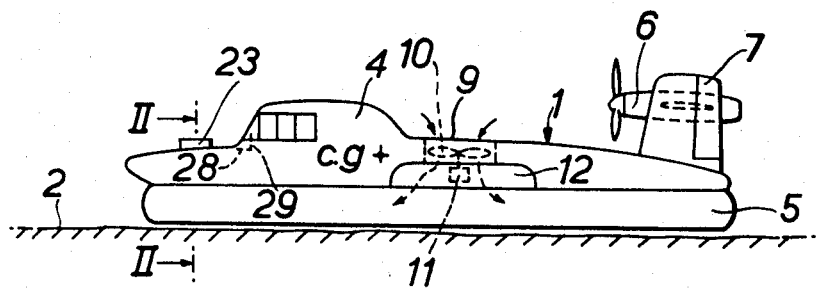
FIG. 1 is a side view of a gas-cushion vehicle.
Figure 2:
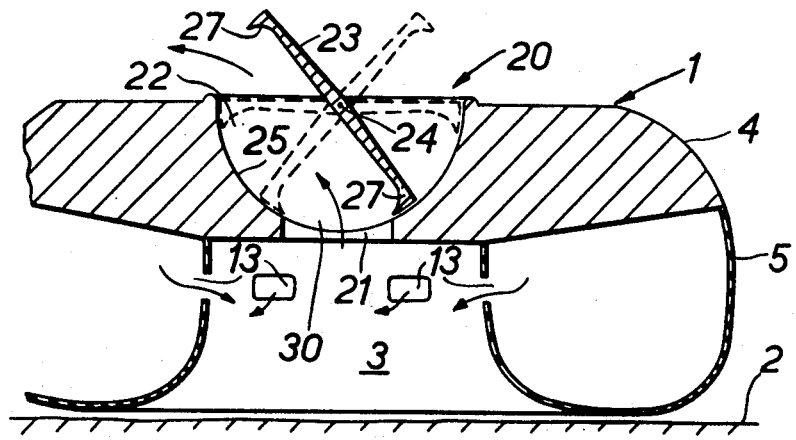
FIG. 2 is a partial section, to an enlarged scale, taken on the lines II—II of FIG. 1.
Figure 3:
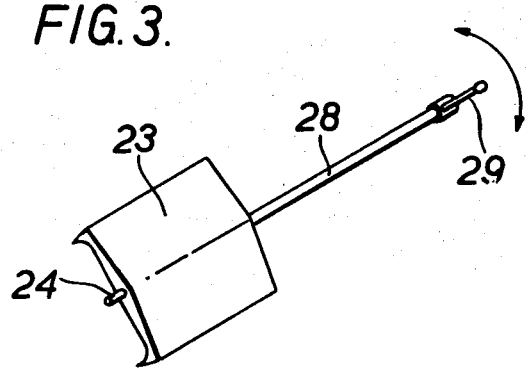
FIG. 3 is a perspective view, from above, of the valve member and operating mechanism.

With reference to FIGS. 1 to 3, a gas-cushion vehicle 1 of the so-called "plenum chamber" type is shown travelling over a ground surface 2 and is supported above the surface by a cushion 3 of pressurised air formed beneath the vehicle body 4 and contained thereunder by an inflated flexible wall or skirt 5 of annular form attached to and depending from the vehicle body.

The vehicle 1 is propelled over the surface 2 by an airscrew propulsion unit 6 and is controlled thereover by twin fin and rudder units 7 and by discharge of cushion air in opposite directions from the front end of the vehicle on each side of the longitudinal axis of the vehicle. The cushion 3 is formed by drawing in air from the atmosphere by way of an intake 9, raising its pressure by means of a fan 10 driven by a variable-speed engine 11 and discharging the air to the interior of the flexible skirt 5 by way of side chambers 12. The air then flows to the space occupied by the cushion, i.e. the cushion space, by way of ports 13 formed in the inner surfaces of the side parts of the skirts. The cushion-forming system used on the vehicle 1 is the same as that used on the "Hovercat" gas-cushion vehicle described and illustrated on page 104 of the "Air-Cushion Vehicles" supplement to "Flight International" of June 16, 1966.

As shown in FIG. 2, lateral discharge of cushion-air for control purposes is controlled by fluid control apparatus 20. The apparatus 20 comprises a structure formed and defined by the vehicle body 4 and which has an air inlet 21 connected to the cushion space, an air outlet 22 defining a concavity of semi-cylindrical form, and a valve member 23 of "butterfly" form mounted for rotation about the axis of a central spindle 24 disposed within the outlet 22 in a substantially fore and aft direction. The valve member 23 is movable from a central, horizontal, position (shown in dotted lines) whereby (as shown in both full and dotted lines) it closes the outlet 22 to two alternative positions whereby it co-operates with the wall 25 of the outlet 22 to allow cushion air to flow from the outlet 22 with alternative, diverging components of direction. Each alternative direction-component of air outflow lies generally normal to the axis of rotation of the valve member 23 and is above the centre of gravity (C.G.) of the vehicle.

The axis of the spindle 24 is co-axial with the central axis of an imaginary, horizontally-disposed cylinder of which the concavity defined by the air outlet 22 is the lower half. The axis of the spindle 24 is thus substantially coincident with the plane of the mouth of the concavity and normal to the semi-circular ends 30 thereof.

The valve member-operating spindle 24 is connected in a direct manner and by means of a co-axial, rearwardly-extending torque tube 28 to a control lever 29 in the cabin of the vehicle 1 so that sideways movement of the lever results in either clockwise or anti-clockwise rotation of the valve member 23. Air is thus released on one side or the other of the fore and aft axis of the vehicle so as to apply, by reaction, lateral thrust forces to the vehicle. The arrangement provides "natural" control of the vehicle 1 in the sense that if the vehicle is required to yaw to one side the control lever is rotated about the axis of the torque tube to that side.

As shown in FIG. 2, the valve member 23 is of plate-like form, the longitudinal margins of the valve member being provided with flange-like extensions 27 which are shaped to serve as guides so as to assist in deflecting out-flowing cushion air to either side of the longitudinal, i.e. fore and aft, axis of the vehicle 1. All the edges of the valve member 23 have only a small clearance (shown somewhat exaggerated in FIG. 2) with the wall 25 of the outlet 22 so that adjacent parts of the valve member 23 and concavity wall 25 are contiguous with each other not only when the valve member is in the central position but also when it is rotated.

The fluid-flow control apparatus 20 not only provides a "puff-port" arrangement that requires the use of only one valve member for two directions of air discharge, it also provides an arrangement wherein horizontally-extending ports are not actually required. In other words, there is no need for air-conducting structure, to be provided above the valve member 23 and substantially normal to the axis of the spindle 24. Furthermore, the apparatus 20 provides an arrangement wherein aerodynamic and mass loads applied to the valve member are not unduly high. This is because, when the valve member 23 is in an open position, aerodynamic and mass loads applied to the upper half of the valve member are substantially balanced by loads of similar magnitude on the lower half thereof. This allows the use of a lightweight valve member as well as reducing the amount of effort needed to rotate the valve member.

Yet a further advantage resides in the fact that, in the above-described example, air is discharged above the centre of gravity (C.G.) of the vehicle. Thus, when the vehicle executes a turn, it tends to bank into the turn. To assist this "banking-in" effect, the apparatus may be disposed further above the C.G. of the vehicle, for example, above the cabin of the vehicle.

Alternatively, or in addition, control apparatus 20 may be provided at the rear end of the vehicle 1 so as to cause lateral forces to be applied thereto. When this is done, however, to provide "natural" movement of the associated control lever, the method of connection between the lever and the spindle 23 will require modification.

Figure 4:
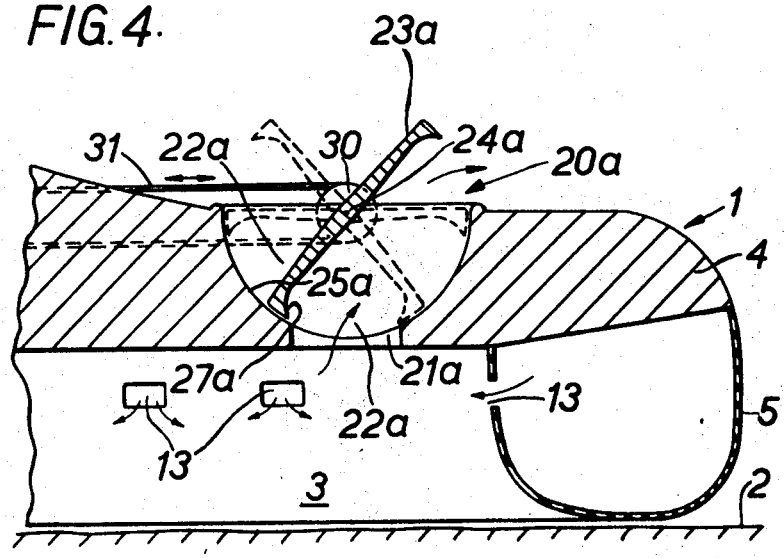
FIG. 4 is a side view, in section, of the rear end of a modified form of the vehicle.

As shown in FIG. 4, the vehicle 1 may be provided at its rear end with apparatus adapted to cause longitudinal thrust forces to be applied to the vehicle. With reference to FIG. 4, a pair a fluid flow control apparatus 20a is disposed at the rear of the vehicle, one on each side of the fore and aft axis thereof so that their spindles 24a are disposed substantially horizontally and substantially normal to the fore and aft axis. Each apparatus 20a (one only being shown) is identical to the apparatus 20 and like components carry the suffix "a." The apparatus may replace the propulsion engine 6 and fins 7.

A pulley 30 is mounted on each spindle 24a so that rotation of the pulley causes corresponding rotation of the spindle. Cables 31 extend between the pulleys 30 and control levers (not shown) within the cabin of the vehicle 1. Appropriate movement of the control cables results in rotation of the valve members 23a either singly or together. The valve members are used to allow fluid to flow with components of directions substantially parallel to the fore and aft axis of the vehicle so as to apply longitudinal thrust forces to the vehicle. These front forces may be used to provide either forward or rearward components of thrust, and either in combination or differentially.

We claim:

1. A gas cushion vehicle provided with control means for applying controlling thrust forces to the vehicle and comprising gas compressor means, a structure defining an upwardly-facing concavity open to atmospheric pressure, an inlet for supplying gas, under pressure, to the concavity at the base thereof, means connecting the discharge side of said gas compressor means to said inlet, a butterfly-valve member mounted for rotation within the concavity about an axis extending across the mouth of the concavity and rotatable from a central position where it closes the mouth of the concavity to two alternative positions one on each side of said inlet wherein alternative portions of the valve member project out of the concavity and direct the flow of gas from the concavity, the concavity and the valve member being formed so that adjacent parts thereof remain contiguous when the valve member is rotated about said axis so that gas is allowed to flow from the mouth of the concavity with alternative, diverging components of direction each of which is generally normal to the axis of rotation of the valve member so as to apply thrust forces to the vehicle.

2. A gas-cushion vehicle as claimed in claim 1 wherein said axis extends fore and aft of the vehicle whereby said thrust forces are applied to the vehicle in lateral directions.

3. A gas-cushion vehicle as claimed in claim 1 wherein said axis extends substantially normal to the fore and aft axis of the vehicle whereby said thrust forces are applied to the vehicle in longitudinal directions.

4. A gas-cushion as claimed in claim 1 wherein said inlet is connected to the space which, in operation of the vehicle, is occupied by the vehicle-supporting cushion.

5. A gas-cushion as claimed in claim 1 wherein said gas flows are discharged from said control means at a point above the center of gravity of the vehicle.

References Cited

UNITED STATES PATENTS

| 3,050,146 | 8/1962 | Crim | 180—116X |
| 3,150,731 | 9/1964 | Franklin et al. | 180—120 |
| 3,342,279 | 9/1967 | Downhill | 180—120 |
| 3,467,213 | 9/1969 | Walker | 180—120 |

A. HARRY LEVY, Primary Examiner

U.S. Cl. X.R.

180—124